R. GIRARDELLI.
ELECTRIC MOTOR FOR TRANSMITTING ANGULAR MOVEMENTS.
APPLICATION FILED MAR. 7, 1912.

1,068,759.

Patented July 29, 1913.

Witnesses:

Inventor
Riccardo Girardelli
by B. Singer Atty

UNITED STATES PATENT OFFICE.

RICCARDO GIRARDELLI, OF ROME, ITALY.

ELECTRIC MOTOR FOR TRANSMITTING ANGULAR MOVEMENTS.

1,068,759.

Specification of Letters Patent.  Patented July 29, 1913.

Application filed March 7, 1912. Serial No. 682,222.

*To all whom it may concern:*

Be it known that I, RICCARDO GIRARDELLI, a subject of the King of Italy, residing at Rome, in the Kingdom of Italy, have invented certain new and useful Improvements in Electric Motors for Transmitting Angular Movements, of which the following is a full, clear, and exact description.

With motors for the transmission of angular movements, and particularly with those which have to overcome considerable resistances in places far away from the operating station, two inconveniences are connected consisting in the high cost of installation and operation owing to the fact that a line must be provided sufficient for the highest power to be developed by the motor, and the losses due to the resistance of the conductor are proportional to the current circulating in the latter, and in the variable degree of accurateness which may be secured in the transmission when the same motor has to cause the movement of parts requiring different power, for the final position of the movable portion of the motor differs always from the position, which it would reach in running without load, by an angle which corresponds to the torque capable of overcoming the final resistance of the driven part. The present invention is a device by means of which both the said inconveniences can be eliminated; according to the invention the line, which starts from the transmitting station, does not serve to feed the motors which actually move the driven devices, but it is designed to feed auxiliary motors, the action of which merely consists in regulating the position of a rotary switch acting on a local circuit which produces the successive displacements of the driving motor according to the positions taken up by the auxiliary motor, which may be one of the known motors employed for repeating angular movements. It is obvious that in this case the main line, which starts from the central transmitting station, has to carry only a very weak current sufficient for feeding the auxiliary motors which have to overcome only the resistance of the switch, and as this resistance is very slight, the building cost of the line is reduced to a low figure; moreover, the said resistance being entirely independent of the value of the power which has to be developed by the large motors, acting directly upon the different devices, the residual errors of the transmitted angular values are always the same. Each of the local circuits as well as the power of each of the large motors is regulated separately according to the kind of work to be performed.

Figure 1:
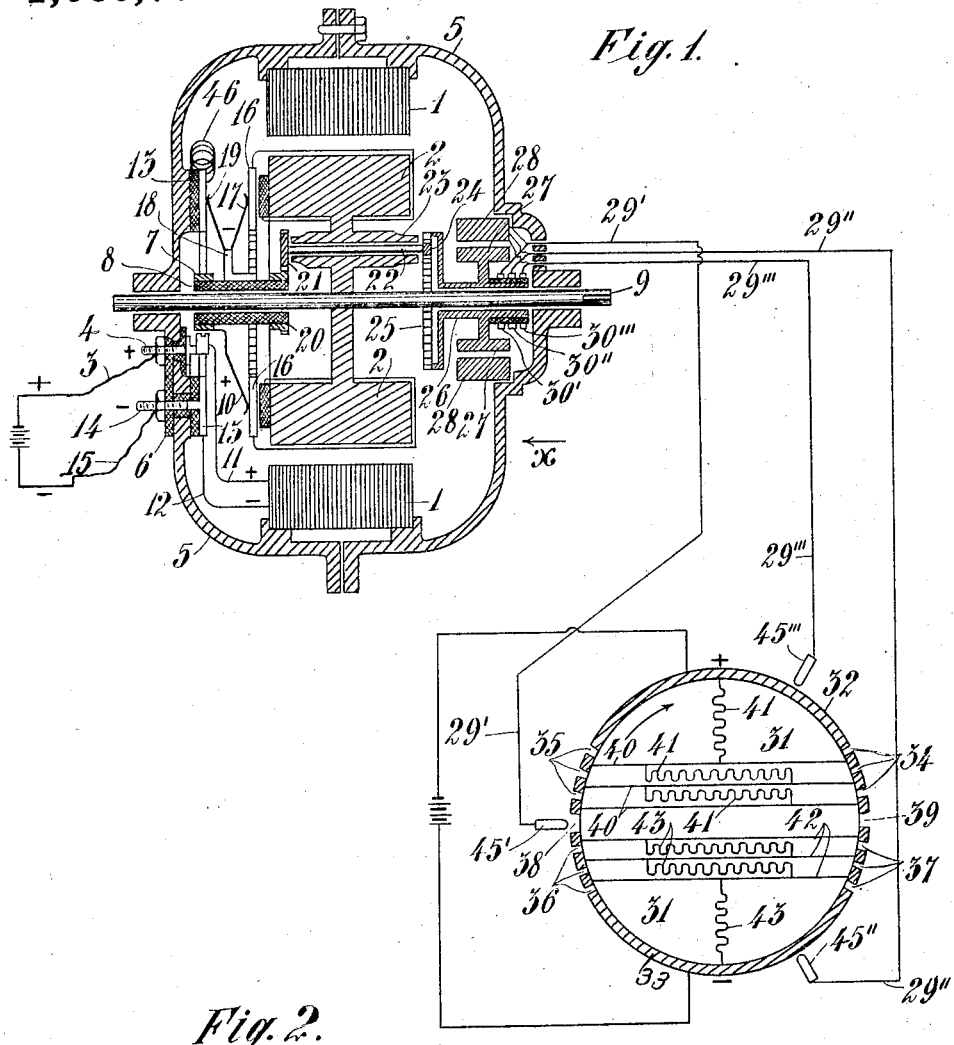
Figure 2:
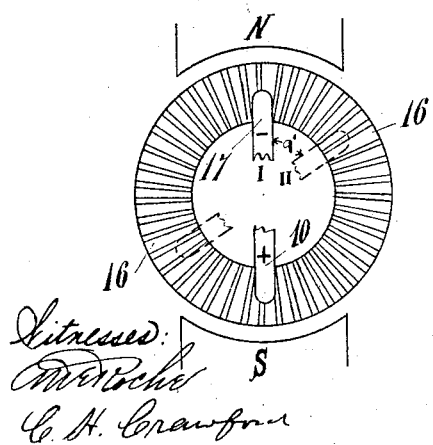
Figure 3:
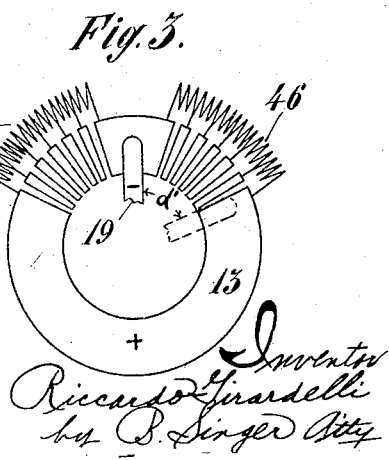

In the annexed drawing, which by way of example represents an embodiment of the motor according to the present invention, Figure 1 shows a section of the motor with a diametrical plane through the axis of its shaft, and its connections with the transmitter. Figs. 2 and 3 are front views respectively of the commutator, the motor and the rheostat, the latter regulating the intensity of the current in the local circuit which feeds the motor.

The motor, properly speaking, can be a direct current or also an alternating current motor, and in the drawing is shown a motor with bipolar field and a ring armature in which motor the field magnets —1— form the fixed portion or stator, and the armature —2— the movable portion or rotor. The winding of the rotor could also be a drum winding, instead of a ring winding, and both the rotor and the stator can be toothed or made with smooth surface. The current feeding this motor comes from a local source through the wire —3— ending at the terminal —4—. This terminal passes through the casing —5— of the motor, then through an insulating packing —6—, and inside the casing —5— it comes into contact with a metallic collar —7— carried by an insulating sleeve —8— mounted loose upon the shaft —9— of the motor. To the collar —7— is fixed the brush —10— leading the current to the rotor. The current is led to the stator by the wire —11— which starts also from the receiving terminal —4—, and the return takes place through the wire —12— ending at a flat metallic ring —13— which has its center on the axis of the shaft —9— and is fastened to the inner surface of the casing —5—, from which it is insulated by the packing —6—. This ring is in metallic communication with the terminal —14—, from which starts the return wire —15— of the motor. The brush —10— slides against the segmental commutator —16— provided upon one of the faces of the rotor —2—, and the return of the current of the rotor is obtained by a second brush —17— distanced 180° from the first one and supported by a foot —18— mounted upon the same insulating sleeve —8— which carries the collar —7— of the brush —10—. The foot —18— carries a third brush —19— in metallic communication with the brush —17— and which slides against the aforesaid metallic ring —13— so that the wire —15— forms the common return path both from the rotor and the stator.

Although in the drawing the segmental commutator is shown as applied to the rotor, it will nevertheless be understood that it could also be applied to the stator, and in this case the polar axis or the several polar axes of the rotor would have an invariable position with respect to the windings of it, while the stator ought to be formed by a drum winding or by a ring winding similar to that represented in the drawing for the rotor, and its poles would have a variable position with respect to the position of the windings corresponding to the position taken up by the brushes. This premised it will easily be understood how the revolution of this motor takes place: when the couple of brushes —10— —17— is in the position shown in Figs. 1 and 2, that is to say when they are on the line of the poles of the field, the rotor stops even if the current is circulating in it. But when the brushes are shifted through an angle $a'$, taking up for instance the position shown in dotted lines in Fig. 2, the rotor starts turning and turns until the brushes are again brought back in the initial position. The displacement of the brushes and their return to the position of rest are obtained by means of the device hereinafter described.

The sleeve —8— which is loose on the shaft —9— and carries the two receiving and return brushes —10— —17—, carries also a toothed wheel —20— which engages with a pinion —21— mounted on the auxiliary shaft — 22— which passes loose in a sleeve —23— through the rotor, and carries at the other end a pinion —24— which engages inside a toothed rim —25—. This toothed rim is mounted upon a sleeve —26— which is also loose on the shaft —9— and carries the rotor —27— of an auxiliary motor, the stator —28— of which is fastened to the casing —5— of the main motor. The current is led to this auxiliary motor by the conductors —29'— —29''— —29'''— which are fixed to brushes sliding against three rings —30'— —30''— —30'''— which place them in communication with the windings of the rotor —27—, and by means of three branches they reach the windings of the stator —28—.

As auxiliary motor may be chosen any of the already known motors employed for transmitting angular movements with the corresponding transmitting apparatus, and in Fig. 1 of the drawing, by way of example and solely for the purpose of showing a complete plant is shown a transmitting apparatus formed by an insulating cylinder —31—, upon which at first are placed two metallic segments —32— —33— and then four sets of contacts —34 - —35— —36— —37— insulated between each other and separating by means of insulating intervals —38— —39— the groups —34— —35—, which form the continuation of the ends of the segment —32—, from the groups —36— —37—, which form the continuation of the end of the segment —33—. Each contact of the group —34— communicates with a contact of the group —35— by means of a wire —40—. The resistances —41— put the segment —32— into communication with the first of the wires —40— and this with the other wires. The wires —42— and the resistances —43— in a similar manner are disposed between the segment —33— and the contact groups —36— —37—.

Against the segments —32— —33— and the four intermediate contact groups slide three brushes —45'— —45''— —45'''— which by means of the wires —29'— —29''— —29'''— send the current to the auxiliary motor, with which the rotor and the stator are in parallel, as shown in the drawing, but also the series arrangement could be adopted. If the rotor and the stator —27— —28— have triphase windings, it is clear that, when the cylinder —31— turns beneath the brushes —45'— —45''— —45'''—, the revolution of the rotor —27— is produced and the number of the positions of rest will depend upon the manner in which the winding has been arranged and upon the number of contacts contained in each of the groups —34— —35— —36— —37—.

The motor works as follows: Let us consider the effect produced by the passage of the rotor —27— from one position to the subsequent one, starting from the position of rest, to which correspond Figs. 1, 2 and 3. Supposing the revolution takes place clockwise when looking in the sense of the arrow $x$. In this case, while the rim —25— toothed inside turns in the aforesaid sense, in the same sense turns also the pinion —24— together with the auxiliary shaft —22— and the pinion —21—. On the contrary, the wheel —20—, which on the outside engages with the pinion —21—, turns in opposite direction thus causing the group of brushes —10— —17— to distribute the current to turn in opposite direction.

Now it will be observed that the ratio of the gearings —20— —21— —24— —25— may be regulated so as to obtain for the brushes —10— —17— of the commutator a deviation larger than the deviation of the rotor —27— and even, if necessary, of a whole quadrant, so that the rotor —2— at the beginning of the displacement is subjected to the action of the highest torque, that the large motor can develop, which occurs in the case of the bipolar motor, when the brushes are at 90° from the line of the poles. Assuming therefore that the rotor of the auxiliary motor passes from one position to the subsequent, stopping in the latter, the brushes of the large motor will turn by 90°, so that the rotor —2— begins its movement with the highest power of which it is capable, turning in the same direction in which the brushes should turn for returning into the initial position. Now while the rotor —2— turns clockwise, looking in the direction of the arrow $x$, it carries along the shaft —22— and the pinion —24— rolls upon the rim —25—, which remains stationary, turning the pinion counter-clockwise and causing at the same time to turn the pinion —21— provided at the other end of the shaft, which pinion —21— however does not simply roll upon the wheel —20—, but it compels the latter to turn also in the direction of the rotor —2— that is to say clockwise, bringing the brushes —10— —17— back in the initial position, in which the torque vanishes and the motor stops, if no further displacements are imparted upon the auxiliary motor. In this initial position the brush —19— of the return of the current is in the position shown in Fig. 3, from which it appears that for the purpose of reducing the consumption of current during the stop of the motor, the ring —13— may be provided with a group of suitably disposed resistances —46— which diminish the current circulating in the rotor —2—. But as soon as the brushes —10— —17— have been shifted by reason of the revolution of the wheel —20— and reached such a position that the brush —19— has taken the position indicated by dotted lines in Fig. 3, that is to say as soon as the arch comprising the resistances has been passed, the current passes in its totality in the rotor —2—, producing the highest torque, which then is diminishing gradually as the brushes, returning in the position of rest, switch in a larger number of resistances: and things could also be arranged in such a way that in the final position where no torque is present no current may pass through the rotor. It is obvious that, if the rotor of the auxiliary motor is continuously turning, the rotor of the main motor will also turn in a continuous manner.

Having now fully described the nature of the said invention, I declare that what I claim is:

1. Device for transmitting angular movements comprising an electric transmitting and a receiving apparatus, conductors connecting the transmitting apparatus to the stator and the rotor of an auxiliary motor of the receiving apparatus, a shaft for the revoluble auxiliary motor, a brush holder, means connecting the rotor of the auxiliary motor to said brush holder, a main motor rotating upon said shaft, a commutator connected to the rotor of the main motor, brushes acting upon said commutator, and a local source of electricity for feeding current to said main motor, substantially as described.

2. In a device of the character described, in combination, an electric transmitting and a receiving apparatus, conductors connecting the said transmitting apparatus to an auxiliary motor of the receiving apparatus, a shaft for said revolving auxiliary motor, an inwardly toothed rim secured to the rotor of said auxiliary motor, loose on said shaft, a pinion meshing with said toothed rim, an auxiliary shaft passing freely through the rotor of a main motor, to one end of which the pinion is secured, a pinion secured to the other end of said auxiliary shaft, a brush holder carrying a toothed wheel engaging said latter pinion, brushes sliding upon a commutator of the rotor of the main motor and a local source of electricity feeding current to said main motor, substantially as described.

3. In a device of the character described, a main motor, a local source of electricity feeding said motor, a commutator secured to the rotor of said motor, brushes slidingly engaging said commutator, a brush connected with one of the latter brushes, a ring connected to the electric source upon which said brush is sliding, and resistances disposed upon this ring to both sides of the sliding brush in its position of rest, substantially as described.

In testimony whereof I have signed in the presence of two subscribing witnesses, in the city of Rome this 26th day of February 1912.

RICCARDO GIRARDELLI.

Witnesses:
 LETTERN LABOCCETTA,
 ANTONINO LABOCCETTA.